United States Patent
Baek

Patent Number: 6,134,288
Date of Patent: Oct. 17, 2000

[54] APPARATUS AND METHOD FOR GENERATING A DECODING CLOCK SIGNAL IN RESPONSE TO A PERIOD OF WRITE AND READ CLOCK SIGNALS

[75] Inventor: Jong Seob Baek, Kyoungki-do, Rep. of Korea

[73] Assignee: Hyundai Electronics Industries Co., Ltd., Rep. of Korea

[21] Appl. No.: 08/953,009

[22] Filed: Oct. 16, 1997

[30] Foreign Application Priority Data

Oct. 16, 1996 [KR] Rep. of Korea ............ 96-46238

[51] Int. Cl.⁷ ............... H04L 7/00; H04L 25/00; H04L 25/40
[52] U.S. Cl. .................... 375/372; 370/505; 327/141
[58] Field of Search .................. 375/371, 372, 375/354, 224, 225, 213, 259, 377, 355; 370/516, 503, 505; 341/61; 327/141, 144; 709/400; 713/400, 500, 600

[56] References Cited

U.S. PATENT DOCUMENTS

| | | |
|---|---|---|
| 5,029,331 | 7/1991 | Heichler et al. ............ 371/43 |
| 5,200,982 | 4/1993 | Weeber . |
| 5,452,010 | 9/1995 | Doornink . |

FOREIGN PATENT DOCUMENTS

| | | |
|---|---|---|
| 63-115430 | 5/1988 | Japan . |
| 63198420 | 8/1988 | Japan . |
| 64-23625 | 1/1989 | Japan . |
| 03104421 | 5/1991 | Japan . |
| 2311449 | 9/1997 | United Kingdom . |

Primary Examiner—Chi H. Pham
Assistant Examiner—Jean B Corrielus
Attorney, Agent, or Firm—Blakely Sokoloff Taylor & Zafman

[57] ABSTRACT

Disclosed is an apparatus and a method for generating decoding clock signals in response to a period of write and read clock signals for decoding transmission data, which is suppressed in a form of punctured code at a code rate. The apparatus according to the present invention comprises a) a clock generator receiving a control signal and a code rate from a transmission part, for rearranging a suppressed data; b) a controller receiving a write clock signal from an external circuit and a read clock signal from the clock generator, for controlling a period of a read clock signal wherein the period of the read clock signal is correspondent to the number of data stored in the memory; c) a decoding clock generator receiving a system clock signal from an external circuit and the control clock signal from the controller, for outputting a decoding clock signal.

3 Claims, 5 Drawing Sheets

FIG. 1

| code rate | 1/2 | 2/3 | 3/4 | 5/6 | 7/8 |
|---|---|---|---|---|---|
| I | X1 | X1 Y2 Y3 | X1 Y2 | X1 Y2 Y4 | X1 Y2 Y4 Y6 |
| Q | Y1 | Y1 X3 Y4 | Y1 X3 | Y1 X3 X5 | Y1 Y3 X5 X7 |

FIG. 2

| code rate | 1/2 | 2/3 | 3/4 | 5/6 | 7/8 |
|---|---|---|---|---|---|
| X | I1 | I1*Q2* | I1*Q2 | I1*Q2*Q3 | I1***Q3*Q4 |
| Y | Q1 | Q1 I2 I3 Q3 | Q1 I2* | Q1 I2*I3* | Q1 I2 Q2 I3*I4* |

| code rate | 1/2 | 2/3 | 3/4 | 5/6 | 7/8 |
|---|---|---|---|---|---|
| IQclock | 1 | 3 | 2 | 3 | 4 |
| XYclock | 1 | 4 | 3 | 5 | 7 |

(write operation)

(read operation)

| STATE | DESCRIPTION |
|---|---|
| 0 | THE NUMBER OF XY CLOCK IS MORE THAN THAT OF IQ CLOCK |
| 1 | THE NUMBER OF XY CLOCK IS THE SAME AS THAT OF IQ CLOCK |
| 2 | THE NUMBER OF XY CLOCK IS LESS THAN THAT OF IQ CLOCK BY ONE |
| 3 | THE NUMBER OF XY CLOCK IS LESS THAN THAT OF IQ CLOCK BY TWO |

APPARATUS AND METHOD FOR GENERATING A DECODING CLOCK SIGNAL IN RESPONSE TO A PERIOD OF WRITE AND READ CLOCK SIGNALS

BACKGROUND OF THE INVENTION

1. Field of the Invention

The present invention relates to a digital communication system, and more particularly to an apparatus and a method for generating decoding clock signals in response to a period of write and read clock signals for decoding transmission data, which is suppressed in a form of punctured code at a code rate.

2. Description of the Related Art

In a digital communication network, a transmission part transmits to a receiving part a data suppressed in a form of punctured code and the receiving part decodes the suppressed data according to a code rate. At the receiving part, the type of data suppression depends upon the code rate.

FIG. 1 is a schematic diagram illustrating an output format of data suppressed at a code rate. In FIG. 1, I and Q denote suppressed output data and X and Y denote original data. As shown in FIG. 1, in case of the code rate of $2/3$, the transmission part transmits to the receiving part the data which is suppressed by using six data out of eight data. That is, the transmission part transmits the suppressed data I and Q consisting of six data out of eight data of X1, X2, X3, X4, Y1, Y2, Y3 and Y4, exclusive of data of X2 and X4, according to the code rate.

On the other hand, in case of the code rate of $3/4$, the transmission part transmits to the receiving part the suppressed data I and Q consisting of four data out of six data of X1, X2, X3, Y1, Y2 and Y3, exclusive of data of X2 and Y3, according to the code rate. Also, in case of the code rate of $5/6$, the transmission part transmits to the receiving part the suppressed data I and Q consisting of six data out of ten data of X1, X2, X3, X4, X5, Y1, Y2, Y3, Y4 and Y5, exclusive of data of X2, X4, Y3 and Y5, according to the code rate. Further, in case of the code rate of $7/8$, the transmission part transmits to the receiving part the suppressed data I and Q consisting of eight data out of fourteen data of X1, X2, X3, X4, X5, X6, X7, Y1, Y2, Y3, Y4, Y5, Y6 and Y7, exclusive of data of X2, X3, X4, X5, Y6 and Y7, according to the code rate.

The punctured code is decoded into the originally non-punctured code at the receiving part. In other words, the receiving part obtains the original data (X and Y) from the suppressed data (I and Q) and the code rate, by decoding the data deleted at the transmission part.

The conventional decoding clock generator has used system clock signals which are different in phase by using a PLL. However, the conventional decoding clock generator has a problem in that the PLL makes it complicated.

SUMMARY OF THE INVENTION

It is an object of the present invention to provide an apparatus and a method for generating decoding clock signals for decoding suppressed data, by referring a coding rate used in suppressing data to be transmitted in response to a period of clock signals for reading data from FIFO.

In accordance with an aspect of the present invention, there is provided an apparatus for decoding suppressed data stored in a memory, the apparatus comprising: a clock generating means receiving a control signal and a code rate from a transmission part, for rearranging a suppressed data; a control means receiving a write clock signal from an external circuit and a read clock signal from the clock generating means, for controlling a period of a read clock signal wherein the period of the read clock signal is correspondent to the number of data stored in the memory; and a decoding clock generating means receiving a system clock signal from an external circuit and the control clock signal from the control means, for outputting a decoding clock signal.

In accordance with another aspect of the present invention, there is provided a method for generating a decoding clock signal in a digital communication system including a transmission part having a code puncturing apparatus and a receiving part having a code depuncturing apparatus, the method the steps of: evaluating a code rate received from the transmission part; indicating positions of deleted data in suppressed data and rearranging the suppressed data in response to the code rate; evaluating whether there is data to be read out in a memory or not; and outputting a control signal if there is data to be read out from the memory and outputting a decoding clock signal by combining the control signal and a system clock signal.

BRIEF DESCRIPTION OF THE DRAWINGS

The novel features believed characteristic of the invention, as well as other features and advantages thereof, will best be understood by reference to the following detailed description of a particular embodiment, read in conjunction with the accompanying drawings, wherein:

FIG. 1 is a schematic diagram illustrating an output format of data suppressed at a code rate;

FIG. 2 is a schematic diagram illustrating an output format of data decoded at a code rate according to the present invention;

DETAILED DESCRIPTION OF THE PREFERRED EMBODIMENTS

Figures 3, 5:
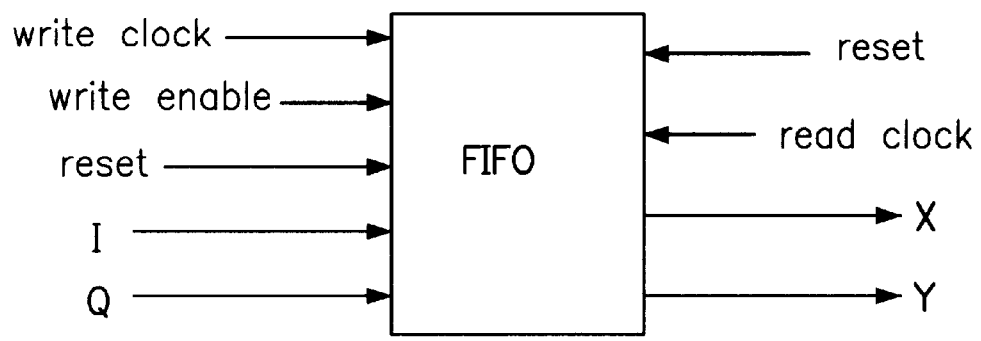
FIG. 3 is a schematic diagram illustrating a FIFO according to the present invention.
FIG. 5 is a schematic diagram illustrating the number of system clock signals required for one period of write/read clock signal at a code rate according to the present invention.

Hereinafter, the present invention will be described in detail referring to accompany drawings.

FIG. 2 is a schematic diagram illustrating an output format of data decoded at a code rate according to the present invention, in which the reference numerals I and Q denote suppressed data. Referring to FIG. 2, in case where the code rate at a transmission part is $2/3$, a receiving part gives a specific mark to the deleted data. That is, the receiving part obtains the original data X and Y out of the suppressed data, by decoding the suppressed data I and Q, and also a specific mark (*) is set in the deleted data positions X2 and X4 which was suppressed at the transmission part. Likewise, in case where the code rate at the transmission part are ¾, ⅝ and ⅞, respectively, the receiving part obtains the original data X an Y out of the suppressed data by setting a specific mark (*) in the deleted data positions which was suppressed at the transmission part.

Figure 4:
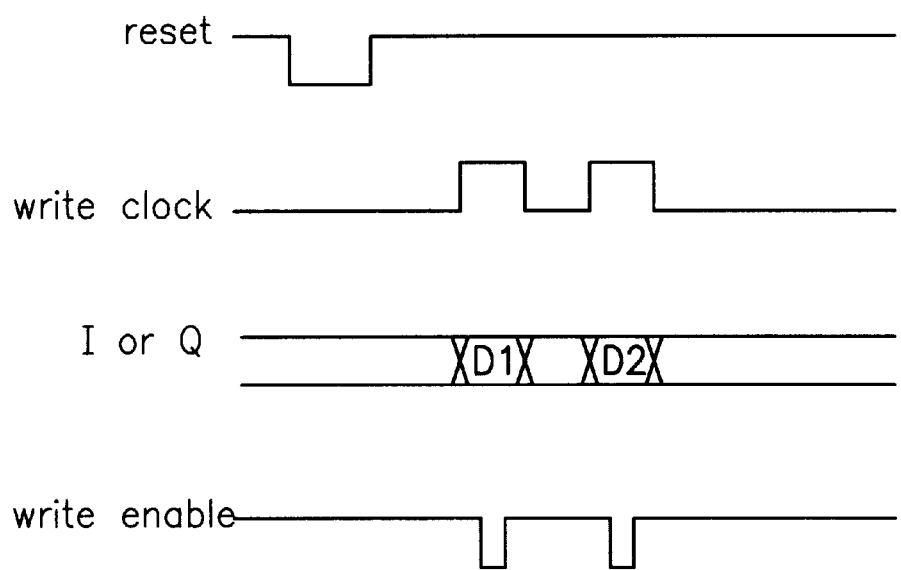
FIG. 4 is a timing diagram of write/read clock signals in the FIFO according to the present invention.
Figure 4:
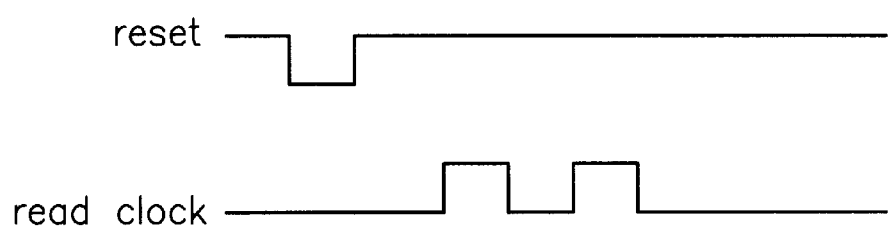

FIG. 3 is a schematic diagram illustrating a FIFO according to the present invention and FIG. 4 is a timing diagram of write/read clock signals in the FIFO according to the present invention.

The FIFO stores the data I and Q in response to a write enable signal and the write clock signal IQ and outputs the suppressed data in response to the read clock signal XY, as shown in FIG. 2. That is, when the data is read out from the FIFO, the read clock signal should have a longer period than the write clock signal and the difference corresponds the time required to decode the deleted data. To rearrange the suppressed data into the original data, the FIFO selectively reads and outputs the data I and Q.

FIG. 5 is a schematic diagram illustrating the number of system clock signals required for one period of write/read clock signal at the code rate according to the present invention. In case where the decoded recovery data format, as shown in FIG. 2, is used, a period of the read clock signal XY is shorter than that of the write clock signal IQ. At this time, the read clock signal XY is generated by the system clock signal of which period is shorter than that of the write clock signal IQ and the read clock signal XY. That is, in case where the code rate is ½, it is possible to use the write clock signal IQ instead of the read clock signal XY because a period of the write clock signal IQ is the same as that of the read clock signal XY.

However, for example, in case where the code rate is ⅔, the system clock signals are four times generated for one period of the read clock signal XY while the system clock signals are three times generated for one period of the write clock signal IQ. Also, in case where the code rate is ¾, the system clock signals are three times generated for one period of the read clock signal XY while the system clock signals are twice generated for one period of the write clock signal IQ. Further, in case where the code rate is ⅚, the system clock signals are five times generated for one period of the read clock signal XY while the system clock signals are three times generated for one period of the write clock signal IQ. In similar, in case where the code rate is ⅞, the system clock signals are seven times generated for one period of the read clock signal XY while the system clock signals are four times generated for one period of the write clock signal IQ.

Figure 6:
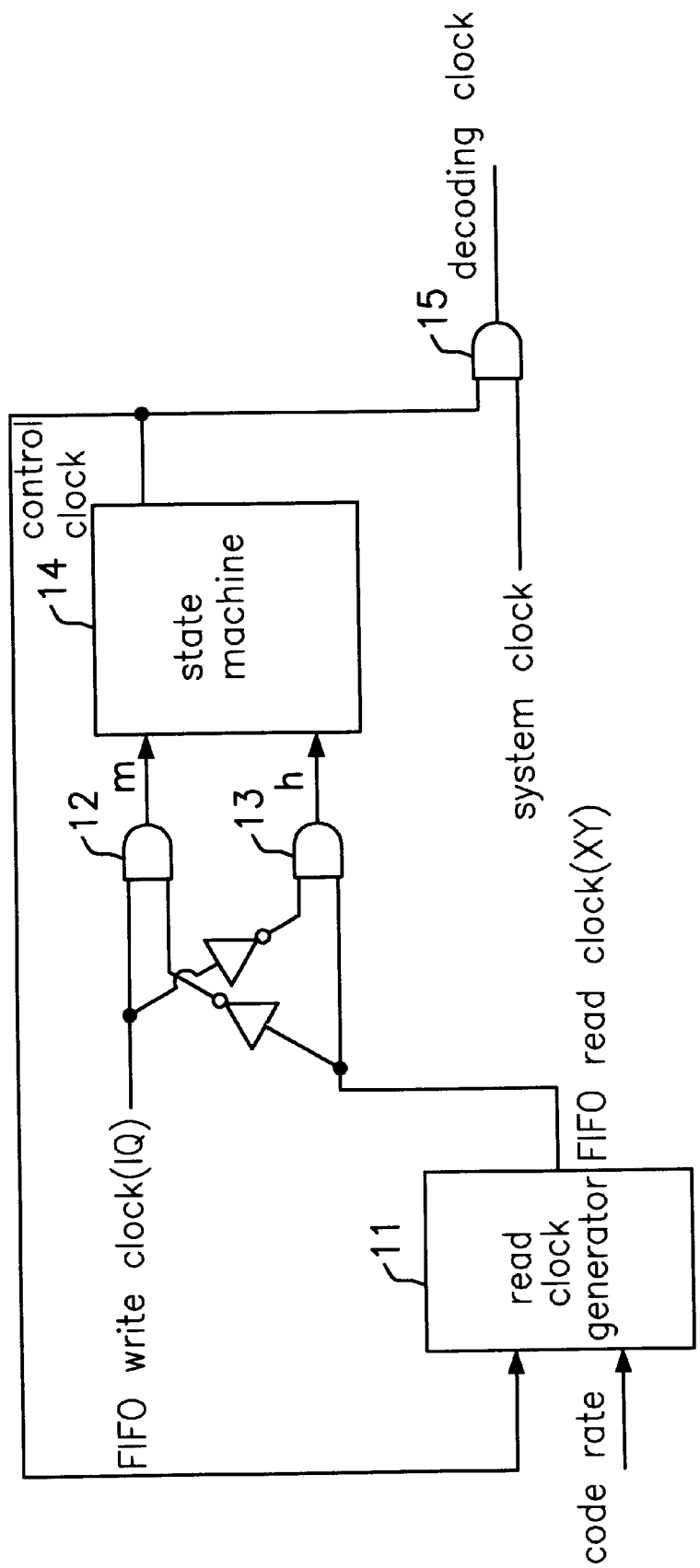
FIG. 6 is a schematic diagram illustrating a generation of decoding signals using FIFO read clock signals and FIFO write clock signals from a decoding clock signal generator according to the present invention.

FIG. 6 is a schematic diagram illustrating a generation of decoding signals using the FIFO read clock signals and FIFO write clock signals from the decoding clock signal generator according to the present invention. In FIG. 6, the reference numeral 11 denotes a read clock controller, 12, 13 and 15 logic AND gates and 14 a state machine, respectively.

The read clock generator 11 receives a control signal and the code rate from the transmission part and generates the FIFO read clock signal XY for reading the FIFO. To inform the state machine 14 of the number of data stored in the FIFO, the logic AND gate 12 receives the FIFO write clock signal and the inverted signal of the FIFO read clock signal output from the read clock generator 11. Also, to inform the state machine 14 of the number of data stored in the FIFO, the logic AND gate 13 receives the inverted FIFO write clock signal and the FIFO read clock signal output from the read clock generator 11.

The state machine 14 receives the outputs from the logic AND gates 12 and 13 and evaluates the state of FIFO storing the data, by comparing the output (m) from the logic AND gates 12 with the output (h) from the logic AND gate 13. For example, it results in an increase of "one" in state value if the output (m) from the logic AND gate 12 is input into the state machine 14, and it results in a decrease of "one" in state value if the output (h) from the logic AND gate 13 is input into the state machine 14. According to the variation of these state values, the state machine 14 outputs a control signal. Also, the control signal from the state machine 14 is input into the read clock generator 11 and then controls it. The logic AND gate 15 receives the control signal from the state machine 14 and a system clock signal and outputs decoding clock signals.

Figures 7, 8:
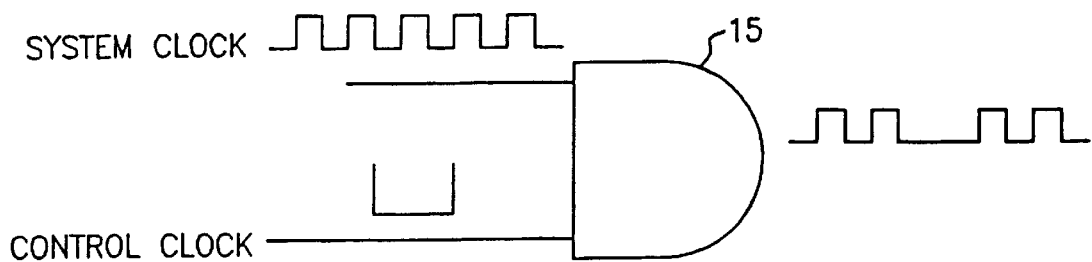
FIG. 7 is a schematic diagram illustrating a state machine according to the present invention.
FIG. 8 is a schematic diagram illustrating a decoding clock signal to the present invention.

FIG. 7 is a schematic diagram illustrating the state machine according to the present invention. The state is "0", in case where the number of XY clock signals is more than that of IQ clock signals, so that the state "0" indicates that there is no data stored in the FIFO and the state is "1", in case where the number of XY clock signals is the same as that of IQ clock signals, so that the state "1" indicates that the FIFO empties. Also, the state is "2", in case where the number of XY clock signals is less than that of IQ clock signals by one period, so that the state "2" indicates that the FIFO has data and the state is "3", in case where the number of XY clock signals is less than that of IQ clock signals by two periods, so that the state "3" indicates that the FIFO has data of two data blocks. Accordingly, in case of the state of "2" and "3", the decoding clock signal is generated by the system clock signal when the control signal is in a high level and, in case of the state of "0" and "1", the decoding clock signal is not generated.

Referring FIGS. 6 and 8, to generate the FIFO read clock signal XY, the read clock generator 11 generates only signals corresponding a timing for indicating position of the deleted data and for reading the data with the classification of I and Q. Further, in case where the data is stored in the FIFO, the state machine 14 outputs into the logic AND gate 15 the FIFO read clock signal generated by the read clock generator 11. Then, the logic AND gate 15 may obtain the number of periods of the system clock, i.e., decoding clock signals, required in one period of the XY clock signal by logically multiplying the system clock signal by the control signal from the state machine 14 according to the code rate. For example, in case of the code rate of ⅔, the period of the XY clock signal requires four system clock signals. Accordingly, with respect to the six periods of the system clock signal, the four periods may be obtained through the multiplication of two periods.

As apparent from above description, the present invention rearranges the suppressed data and then generates the original data, by producing decoding clock signals having different periods corresponding to the code rate. Also, the present invention doesn't have a PLL (Phase Looked Loop), thereby simplifying the decoding clock generator.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for generating a decoding clock signal for use in decoding suppressed data stored in a memory, the apparatus comprising:

a clock generating means receiving a control signal and a code rate from a transmission part, for generating a read clock signal corresponding to the number of original data of the suppressed data;

a first detecting means receiving a write clock signal from an external circuit and an inverted signal from the clock generating means, for generating a first detection signal representing an input of the write clock signal;

a second detecting means receiving an inverted signal from the write clock signal and the read clock signal from the clock generating means, for generating a second detection signal denoting an input of the read clock signal;

a control means receiving the first and the second detection signals, for generating the control signal for use in controlling a period of the read clock signal wherein the write clock signal corresponds to the number of suppressed data to be stored in the memory; and a decoding clock generating means receiving a system clock signal from the external circuit and the control clock signal from the control means, for outputting the decoding clock signal.

2. The apparatus in accordance with claim 1, wherein the control means comprises a state machine for controlling a period of the control signal in response to the first detection signal representing the input of the write clock signal or the second detection signal denoting the input of the read clock signal from the clock generating means.

3. A method for generating a decoding clock signal for use in decoding suppressed data stored in a memory, the method comprising:

a) in response to a control signal and a code rate from a transmission part, generating a read clock signal corresponding to the number of original data of the suppressed data;

b) in response to a write clock signal from an external circuit and an inverted signal from the read clock signal, generating a first detection signal representing an input of the write clock signal;

c) in response to an inverted signal from the write clock signal and the read clock signal, generating a second detection signal denoting an input of the read clock signal;

d) in response to the first and second detection signals generating the control signal for use in controlling a period of the read clock signal wherein the period of the write clock signal corresponds to the number of suppressed data to be stored in the memory; and e) in response to a system clock signal from the external circuit and the control clock signal generated for use in controlling the period of the read clock signal outputting the decoding clock signal.

* * * * *